May 2, 1967
G. E. HORNSBY
3,316,581
CASTER WHEEL MEANS WITH SHOCK ABSORBER MEANS
FOR FURNITURE AND THE LIKE
Filed Feb. 17, 1965
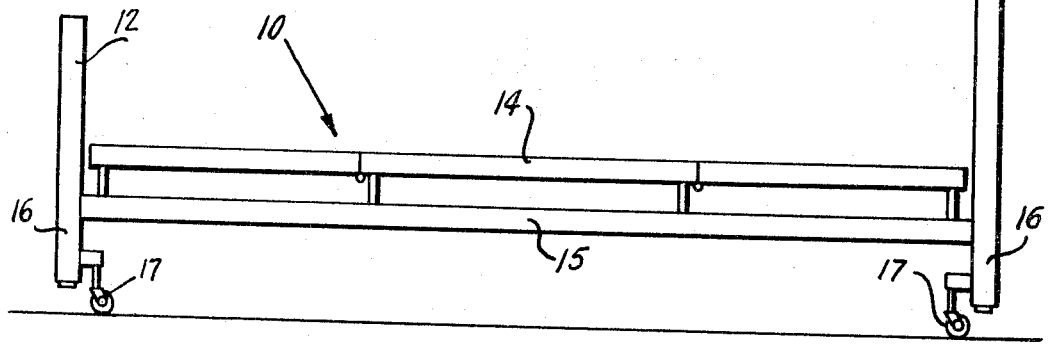
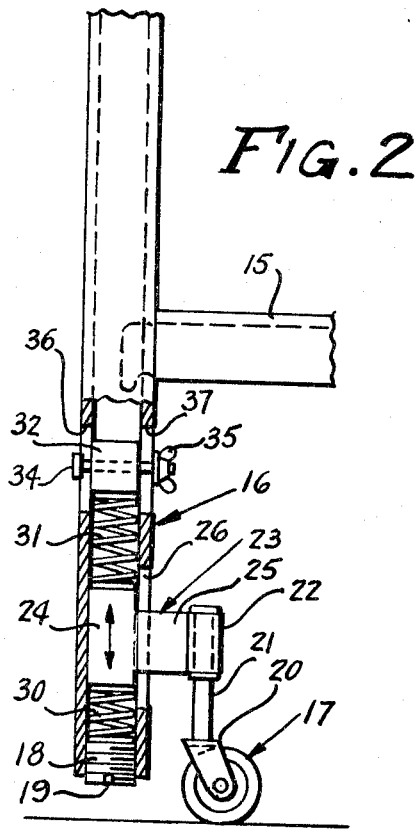
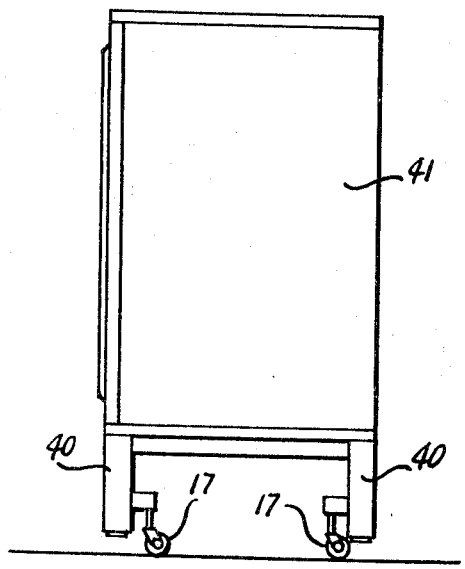
INVENTOR.
GUYTON E. HORNSBY
BY *Kimmel, Crowell & Weaver*
ATTORNEYS.

United States Patent Office 3,316,581
Patented May 2, 1967

3,316,581
CASTER WHEEL MEANS WITH SHOCK ABSORBER MEANS FOR FURNITURE AND THE LIKE
Guyton E. Hornsby, Annandale, Va.,
(P.O. Box 869, Washington, D.C. 20004)
Filed Feb. 17, 1965, Ser. No. 433,271
2 Claims. (Cl. 16—44)

The present invention relates to caster wheels for furniture and the like, and more particularly to the provision of resilient or shock absorbing means in combination with the caster wheels whereby a piece of furniture, such as a bed, television set and the like can be insulated from shock, and other vibrating forces.

In accordance with the present invention caster wheels are provided for attachment to a piece of furniture and spring means are provided for disposition between the piece of furniture supported by the caster wheels and the caster wheels so as to absorb any shock or impact forces that normally are transmitted through the caster wheel to the piece of furniture to which it is attached.

It is an object of the present invention to provide a caster wheel with spring means disposed in the frame to which the caster wheel is connected so as to serve to cushion the frame from any disturbing forces.

It is another object of the present invention to provide a compact and relatively simple structure for utilization with a caster wheel for attachment to a piece of furniture that will serve to cushion the furniture, such as a bed and the like from any jarring forces.

It is yet another object of the present invention to provide a caster wheel that can be attached to a tubular member such as a leg of a piece of furniture and can be slideably disposed therein so as to move in a vertical direction, and permit the insertion of shock absorbing means adjacent the top and bottom of the portion of the caster wheel attached to the tubular member so as to insulate the piece of furniture from jars and vibrations.

It is still another object of the present invention to provide a compact and simple and economical shock absorbing structure in combination with a tubular member of a piece of furniture and a caster wheel, which shock absorbing structure has readily adjustable means incorporated therein so as to vary the force in the spring member components of the structure.

Various other objects and advantages of the present invention will be readily apparent from following detailed description when considered in connection with the accompanying drawing forming a part thereof and in which:

FIGURE 1 is a side elevational view of a bed illustrating the caster wheel shock absorbing means of the present invention;

FIGURE 2 is an enlarged detailed view partly in section of the embodiment of the present invention; and FIGURE 3 is a view of the caster wheel shock absorbing means utilized in connection with a television set.

Referring to the drawings, the reference numeral 10 generally designates a bed having a front board 11 and a bottom board 12. A mattress 14 is disposed on the usual horizontal frame 15.

The front board 11 and the bottom board 12 are conventional and adjacent the lower end thereof consist of the usual vertical legs 16. The legs 16 are supported by the caster wheels 17.

Referring to FIGURE 2 the leg 16 is shown as being hollow adjacent its lower end and has the bottom end internally threaded so as to receive a threaded plug 18 therein. The threaded plug or closure member 18 is provided with a conventional screw driver receiving slot 19 for threading the plug various distances within the end of the member 16.

The caster wheel 17 is carried by the forked end 20 of a vertical stub shaft 21 rotatably inserted within the cylindrical sleeve 22 of a T-shaped support or attaching member 23. The sleeve 22 is normally closed at the top so that it is only necessary to insert the shaft 21 through the open lower end of the sleeve.

The T-shape attaching member 23 is provided with a vertical, cylindrical bar or rod 24 and a substantially flat horizontally extending plate 25 to which the sleeve 22 is attached. If desired the T-shape attaching member 23 may be made in one single piece.

The cylindrical portion 24 is slideably disposed within the tubular member or leg 16 and the flat plate 25 extends through an elongated slot 26 in the leg 16. The slot 26 is of substantially greater length than the height of the plate 25 so that the caster wheel attaching member 23 can be readily adjusted at various heights with respect to the leg 16, and so that it can also readily absorb and cushion any jars or vibrations without abutting the upper and lower edges of the leg 16 adjacent the slot 26.

A helical compression spring 30 is disposed in the leg 16 between the bottom of the cylindrical bar portion 24 and the threaded plug 18. Another helical compression spring 31 is disposed in the leg 16 above the cylindrical portion 24 and below a short cylindrical plug member 32 slideably disposed in the leg 16. The cylindrical plug member 32 is provided with a hole extending therethrough and a bolt 34 is threaded through this hole and a butterfly nut 35 is disposed on one end of the bolt for tightening the member 32 at a specific predetermined location within the leg 16. The leg 16 is provided with 2 laterally aligned vertical slots 36 and 37 in spaced relationship with the slot 26 and the bolt 34 extends through these slots 36 and 37. The member 32 is positioned within the sleeve 16 by loosening the butterfly nut 35 and sliding the member 32 upwardly or downwardly as desired and thereafter tightening the wing nut 35 so as to clamp the member 32 at the desired position. The member 32 allows the force in the spring 31 to be adjusted as desired.

The force in the spring 30 can be varied by threading the plug 18 into the lower end of the leg 16 a predetermined distance or amount.

It will thus be seen from the foregoing description that any jarring or vibrations in the floor upon which the caster wheels are disposed will be cushioned by the springs 30 and 31 so they will not be transmitted to the bed 10. It will also be seen that the force in the springs 30 and 31 can be readily adjusted by the positioning of the plug 32 and the plug 18 as desired. If it is necessary to roll the bed from one position to another it will be readily apparent that the structure of the caster wheel and its shock absorbing means will permit the yielding of the caster wheel should it be pushed over any bumps or obstructions as the bed pushed across the floor.

With respect to FIGURE 3 this invention is substantially the same as that shown in connection with FIGURE 3 except that the caster wheels 17 are connected to the vertical legs 40 of a television set 41. The provision of the caster wheel and shock absorber means of the present invention on the legs of a television set and other various pieces of furniture having sensitive electronic equipment therein will protect the delicate and sensitive equipment from any unnecessary jarring or vibrations.

Various changes in the arrangement of the invention may be made without departing from the spirit and scope of the invention, and the invention is not to be limited except by the scope of the following appended claims.

What is claimed is:

1. In combination a caster wheel and leg with a hollow section having a lower elongated slot and upper aligned spaced elongated slots, a caster wheel attachment member consisting of a bar in said hollow section, a flat plate extending through said lower slot and a caster wheel sleeve on the outer end of said plate for carrying said wheel, a first spring member in said leg below said bar and abutting it, a lower plug abutting the bottom of said spring member and secured to said leg, a second spring member in said leg abutting the top of said bar, and an upper plug abutting the upper end of said second spring, wherein said upper plug consists of a short cylindrical bar with a horizontal hole through it and a bolt extends through said hole and upper slots, and a wing nut is disposed on said bolt for clamping said upper plug at a predetermined location in said leg to adjust the force in said second spring.

2. The combination of claim 1 wherein said lower plug is connected by threads to the lower end of said leg to adjust the force in said first spring.

References Cited by the Examiner
UNITED STATES PATENTS

| | | | |
|---|---|---|---|
| 282,099 | 7/1883 | McDonald | 16—44 |
| 1,314,982 | 9/1919 | Reed | 267—60 |
| 2,176,551 | 10/1939 | Solem | 16—44 |

EDWARD C. ALLEN, *Primary Examiner.*

D. L. TROUTMAN, *Assistant Examiner.*